No. 698,877. Patented Apr. 29, 1902.
G. C. VAUGHN.
APPARATUS FOR LEACHING TANBARK.
(Application filed Aug. 5, 1898.)
(No Model.) 2 Sheets—Sheet 1.
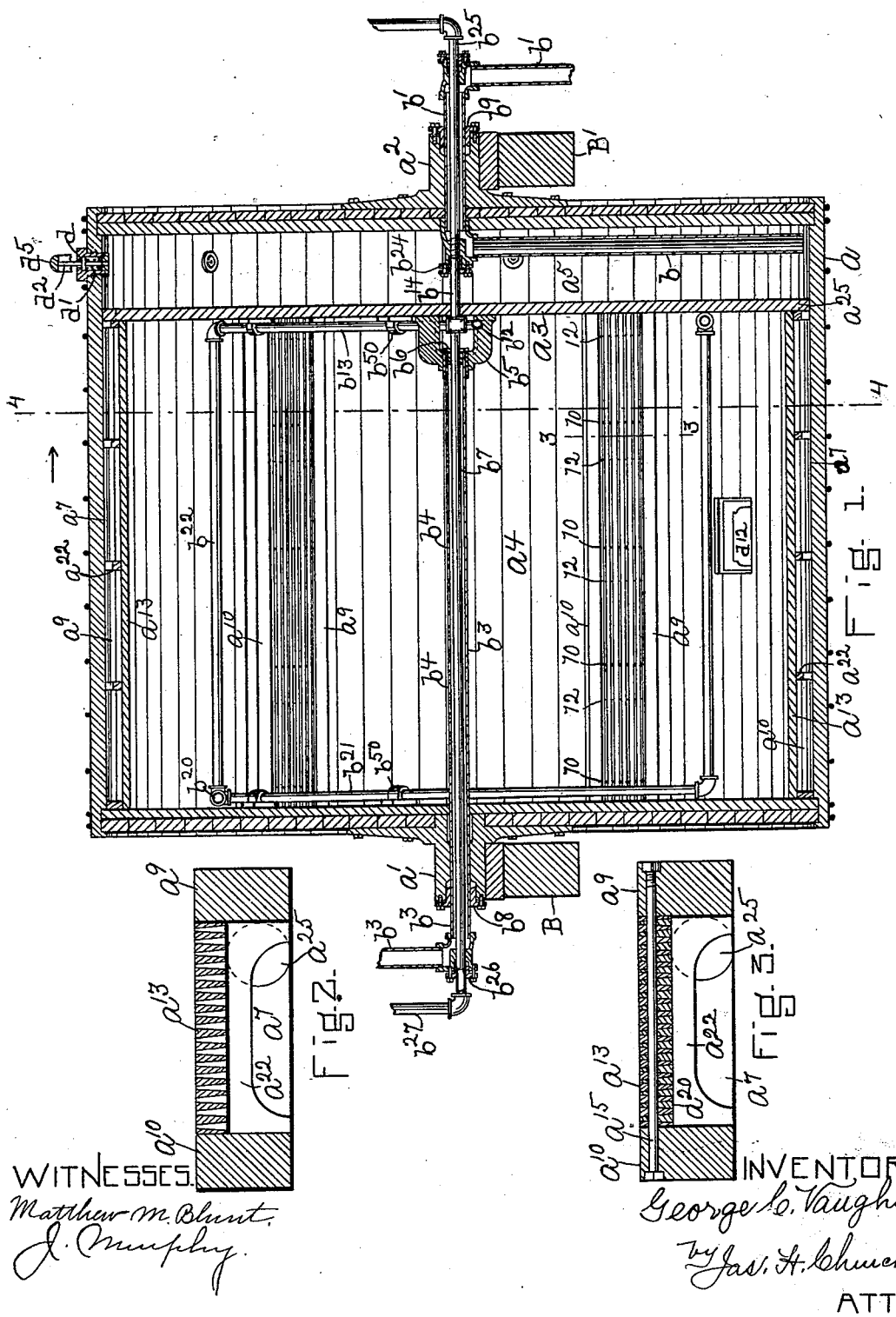
WITNESSES
Matthew M. Blunt
J. Murphy
INVENTOR
George C. Vaughn
by Jas. H. Churchill
ATT'Y No. 698,877. Patented Apr. 29, 1902.
G. C. VAUGHN.
APPARATUS FOR LEACHING TANBARK.
(Application filed Aug. 5, 1898.)

(No Model.) 2-Sheets—Sheet 2.

WITNESSES
Matthew M. Blunt
J. Murphy

INVENTOR
George C. Vaughn
by Jas. H. Churchill
ATT'Y

UNITED STATES PATENT OFFICE.

GEORGE C. VAUGHN, OF SALEM, MASSACHUSETTS, ASSIGNOR, BY MESNE ASSIGNMENTS, TO VAUGHN MACHINE COMPANY, OF BOSTON, MASSACHUSETTS, A CORPORATION OF WEST VIRGINIA.

APPARATUS FOR LEACHING TANBARK.

SPECIFICATION forming part of Letters Patent No. 698,877, dated April 29, 1902.

Application filed August 5, 1898. Serial No. 687,869. (No model.)

*To all whom it may concern:*

Be it known that I, GEORGE C. VAUGHN, a citizen of the United States, residing in Salem, in the county of Essex and State of Massachusetts, have invented an Improvement in Leaching Apparatus for Tanbark, of which the following description, in connection with the accompanying drawings, is a specification, like characters on the drawings representing like parts.

This invention relates to a rotatable leaching apparatus especially adapted for leaching tanbark, and is an improvement upon the invention shown and described in another application, Serial No. 666,396, filed by me January 12, 1898.

My present invention has for its object to provide a rotatable leaching apparatus with which the leaching process may be carried on more expeditiously and without liability of the outlet or outlets for the extract or percolated liquor becoming permanently clogged up or restricted in area by the fine tanbark.

Another feature of this invention consists in a novel heating apparatus within the leaching apparatus whereby a more efficient heating of the leaching liquor and tanbark may be effected.

These and other features of this invention will be pointed out in the claims at the end of this specification.

Figure 4:
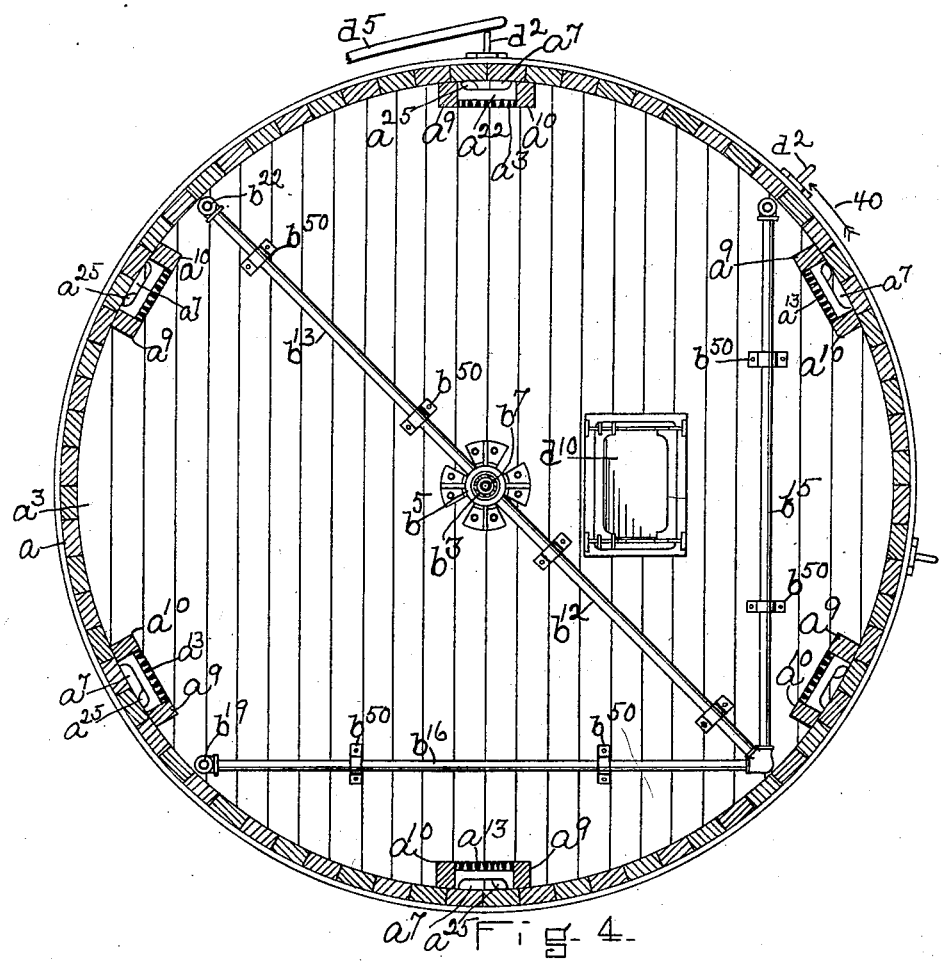

Figure 1 is a vertical longitudinal or axial section of a rotatable leaching apparatus embodying this invention; Fig. 2, a transverse section through one of the extract-outlets, taken on the line 4 4, Fig. 1, and looking toward the right; Fig. 3, a similar section through the same extract-outlet, taken on the line 3 3, Fig. 1; Fig. 4, a transverse section through the apparatus shown in Fig. 1, the section being taken on the line 4 4 looking in the direction of the arrow thereon; and Fig. 5, a detail of the heating apparatus.

In the present instance I have shown this invention as embodied in a rotatable leaching apparatus of the same general structure as that shown in the application above referred to and comprising a rotatable drum $a$, having hollow journals $a'$ $a^2$ and preferably provided with a partition-wall or false head $a^3$, which separates the drum into a leaching-chamber $a^4$ and a liquor-chamber $a^5$. The leaching-chamber $a^4$ is provided with preferably a plurality of separate outlets for the extract or percolated liquor and with lifting devices for the tanbark, and in the present instance said lifting devices forming side walls for the liquor-outlets. The leaching-chamber $a^4$ is provided, as herein shown, with six separate liquor-outlets $a^7$, extended, as shown, longitudinally or axially of the said chamber and disposed about the inner circumference of the drum at substantially equal distances apart; but this number of outlets may be varied. In the present instance the liquor-outlets $a^7$ assume the form of substantially trough-shaped channels having side walls $a^9$ $a^{10}$ and closed at the top by a strainer or screen and, as shown, at the bottom by the circumference of the drum. The strainer or screen referred to is preferably made as herein shown, and consists of a series of substantially V-shaped bars or slats $a^{13}$, of wood or other suitable material, extended the length of the outlet-passage, as herein shown, and secured to the side walls $a^9$ $a^{10}$, as by bolts or stay-rods $a^{15}$, (see Fig. 3,) the said bars or slats being secured in position preferably with the base of the V outermost, so as to reduce the size of the entrance for the liquor into the outlet-passage and obtain a better clearing or cleaning action of the extract liquor upon the strainer, as will be described. The strainer or screen is preferably closed to the passage of the extract at suitable intervals by substantially V-shaped slats or bars $a^{20}$, which are inserted between the slats or bars $a^{13}$, as shown in Fig. 3, and which are held in place by the stay rods or bolts $a^{15}$. The bars or slats $a^{20}$ serve to reinforce or strengthen the strainer or screen and prevent its warping under the influence of heat and moisture when made of wood, which is preferred. The length of the slats or bars $a^{20}$ is indicated by the distance between the points 10 12, Fig. 1. The slats or bars $a^{13}$ may and preferably will be supported at their ends and at suitable points throughout their length by substantially arch-shaped cross-bars $a^{22}$. (See Figs. 1, 2, and 3.) The outlet-passages $a^7$ in the present instance discharge into the chamber $a^5$ through holes or openings $a^{25}$ in the partition-wall $a^3$, and the discharge-opening $a^{25}$ for each liquor-outlet passage is of less area than the area of the said passage and is preferably located at one side of the transverse center of the outlet-passage, as shown in Figs. 2 and 3, for a purpose as will be described.

The chamber $a^5$ constitutes a liquor chamber or well, in which the extract liquor may accumulate and from which the said liquor may be discharged through the depending stationary leg $b$ of the liquor-outlet pipe $b'$, extended through the hollow journal $a^2$.

The leaching-chamber $a^4$ is provided with a liquid-inlet, preferably a substantially large pipe $b^3$, provided with perforations $b^4$ in its upper side and extended to near the partition-wall $a^3$, where it is supported by a spider or frame $b^5$, bolted or otherwise attached to said partition-wall. The liquor-inlet pipe $b^3$ is stationary with relation to the drum, as herein shown, and is closed at its inner end by a suitable stopper or plug $b^6$, through which loosely extends a steam-inlet pipe $b^7$, which passes through the liquid-inlet pipe to the outside of the drum, as shown in Fig. 1. The hollow journals $a'$ $a^2$ are provided with suitable stuffing-boxes $b^8$ $b^9$ and are mounted to turn in suitable supports B B'.

Figure 5:
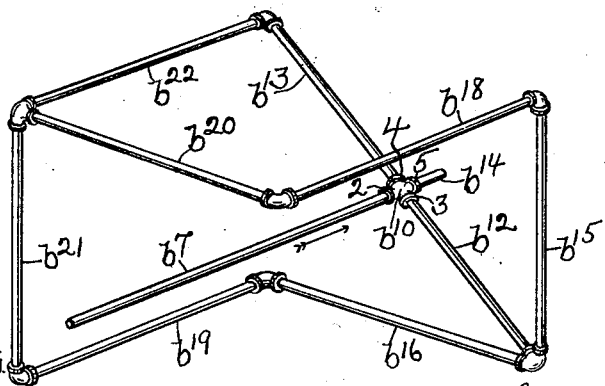

In the present instance the leaching-chamber contains the heating apparatus, which is closed to the passage of steam into the leaching-chamber, thereby avoiding dilution of the extract liquor, and the said heating apparatus is preferably made, as herein shown, so as to obtain a superior heating of the tanbark and leaching liquor. The heating apparatus is best shown in Fig. 5, and consists of a two-way fitting $b^{10}$, provided with four mouths 2 3 4 5. The mouth 2 has connected to it the steam-inlet pipe $b^7$, the mouths 3 4 pipes $b^{12}$ $b^{13}$, and the mouth 5 pipe $b^{14}$. The fitting $b^{10}$ is located close to the partition-wall $a^3$, and the heating apparatus may be secured to said wall in any suitable manner, as by straps $b^{50}$, so that the heating apparatus within the leaching-chamber may revolve with the drum. The pipes $b^{12}$ $b^{13}$ are extended to near the circumferential wall of the drum in substantially diametrically opposite directions, and one of said pipes, as $b^{12}$, is connected to two branch pipes $b^{15}$ $b^{16}$, extended substantially at right angles to near the circumferential wall of said drum, where they are connected to pipes $b^{18}$ $b^{19}$, extended longitudinally of the leaching-chamber to near the side of the drum opposite to the partition-wall $a^3$, where they are respectively connected to branch pipes $b^{20}$ $b^{21}$, extended substantially at right angles to each other and parallel to the branch pipes $b^{16}$ $b^{15}$, the pipes $b^{20}$ $b^{21}$ being connected to a pipe $b^{22}$, extended longitudinally of the drum and joined to the pipe $b^{13}$. The pipe $b^{14}$ is extended through the partition-wall and into a stuffing-box $b^{24}$ in the liquor-outlet pipe $b'$, where it meets or abuts against a pipe $b^{25}$, extended through the said liquor-outlet pipe, the pipe $b^{25}$ constituting the steam-outlet pipe for the heating apparatus. The steam-inlet pipe $b^7$ extends through the liquor-inlet pipe $b^3$ into a stuffing-box $b^{26}$, wherein it meets or abuts against a steam-supply pipe $b^{27}$. It will be seen that the steam-pipes $b^7$ $b^{14}$ are free to turn in the stuffing-boxes $b^{26}$ $b^{24}$, which construction permits the heating apparatus within the leaching-chamber to revolve with the drum. The course of the steam through the heating apparatus may be traced as follows, viz: through the pipe $b^7$ to the fitting $b^{10}$, thence by the pipe $b^{12}$, branch pipes $b^{15}$ $b^{16}$, pipes $b^{18}$ $b^{19}$, branch pipes $b^{20}$ $b^{21}$, pipes $b^{22}$ $b^{13}$ to the fitting $b^{10}$, thence through the pipe $b^{14}$ and outlet-pipe $b^{25}$. It will thus be seen that the interior of the leaching-chamber is thoroughly heated and that the heat is well distributed throughout the contents of the chamber, which results in a more uniform and superior heating of the tanbark and leaching liquor, thereby quickening the leaching process.

The heating apparatus referred to creates a steam-pressure within the drum, and to prevent this pressure exceeding a predetermined point the drum may be provided with preferably a series of vent-openings normally closed by relief-valves of any suitable or desired construction, which may operate automatically or which may be positively operated, which latter method of operating said valves is herein illustrated. In the present instance the vent-openings are made in the circumferential wall of the liquor-chamber $a^5$, and each of said openings is controlled by a valve $d$, normally seated by a spring $d'$, encircling its stem $d^2$, which is extended outside of the drum and, as shown, is adapted in the revolution of the drum to meet an actuating device, shown as a bar $d^5$, which acts in the nature of a cam to open the relief-valve and maintain it open until in the travel of the drum the valve-stem $d^2$ is removed from engagement with said bar or cam, whereupon the spring $d'$ closes the valve.

The false head or partition-wall $a^3$ may and preferably will be provided with a suitable manhole normally closed by a door $d^{10}$, (see Fig. 4,) through which access may be had to the liquor-chamber, and the leaching-chamber may be entered through a suitable manhole in its circumferential wall, which is normally closed by a cover or door $d^{12}$, and preferably said leaching-chamber will be provided with two manholes substantially diametrically opposite.

In operation tanbark, preferably in a fine or comminuted state, is placed in the leaching-chamber until the latter is preferably substantially two-thirds full, and water or a weak leaching liquor is then admitted into said chamber through the liquor-inlet pipe $a^3$, from which the said leaching liquor passes upward into the leaching-chamber through the perforations $b^4$ in said pipe and preferably fills the space above the mass or body of tanbark. Steam is then circulated through the heating apparatus and the drum is set in motion, which may be accomplished in any suitable manner—as, for instance, by suitable chains, (not shown, but which are passed about the periphery of the drum.) The leaching liquor percolates down through the mass of tanbark, and the extract or percolated liquor passes through the strainer or screen of each outlet-passage and in the construction herein shown flows through said passage into the liquor-chamber, from which it may be drawn off through the liquor-outlet pipe $b'$ by a suitable pump, (not herein shown,) by means of which a continuous circulation of the leaching liquor through the tanbark is effected. As the drum revolves, for instance, in the direction indicated by arrow 40, Fig. 4, a portion of the lower part of the mass or body of the tanbark is carried up with the drum by the lifting devices, which in the present instance are the side walls $a^9$ of the outlet-passages for the leaching-chamber, and the bark thus lifted is carried above the upper surface of the mass of bark and discharged upon the upper surface of the said mass, passing down through the body of leaching liquor which rests upon the mass of bark. As the lower portion of the mass of bark is elevated, as described, the mass or greater part of the bark descends by gravity into position to have another portion lifted by the next lifting device. It will thus be seen that the mass of tanbark is put in motion, so that all its particles are exposed to the action of the leaching liquor, while at the same time the greater portion of the bark is maintained in a compact form and presents a body of substantially uniform density, so that the leaching liquor percolates through the bark at a uniform rate, which results in a maximum extraction of the tannin matter in a minimum time at a minimum expense and with a uniform strength of extract liquor.

By reference to Fig. 4 it will be seen that the discharge-opening $a^{25}$ for the liquor-outlet passage $a^7$ is located at one side of the transverse center of said passage, which construction is preferred, as a substantially large amount of the extract or percolated liquor will remain in the outlet-passage $a^7$ and will be discharged back into the leaching-chamber when the outlet-passage has been carried to a sufficient elevation. When the extract or percolated liquor is thus discharged back into the leaching-chamber, it passes through the screen or strainer in a reverse direction, and thereby washes the strainer clean and removes any of the fine bark which might clog up the outlet-passage, so that when this outlet-passage is again brought under the mass of tanbark a free outlet is afforded for the extract. In other words, the outlet-passage for the extract liquor is self-cleaning, and the V-shaped spaces between the bars or slats facilitate the cleaning action of the extract liquor discharged back into the leaching-chamber.

I claim—

1. In a leaching apparatus, a rotatable drum having a partition-wall forming a leaching-chamber and a liquor-chamber, and provided with a liquid-inlet for the leaching-chamber and with a plurality of separate outlets located within the leaching-chamber near the circumferential wall of the drum to move with the same and pass below the body of material being leached for the passage of extract or percolated liquor from said leaching-chamber into said liquor-chamber, strainers for said outlets affixed to the drum to pass below the said body of material, and means within the leaching-chamber to lift a portion of the material to be leached, substantially as described.

2. In a leaching apparatus, a rotatable drum having a partition-wall forming a leaching-chamber and a liquor-chamber, and provided with a liquid-inlet for said leaching-chamber, and with a plurality of separate outlets located within the leaching-chamber near the circumferential wall of the drum to move with the same and pass below the body of material being leached for the passage of extract or percolated liquor from said leaching-chamber into said liquor-chamber, strainers for said outlets affixed to the drum to pass below the said body of material, means within the leaching-chamber to lift a portion of the material to be leached, and a heating apparatus within said leaching-chamber, substantially as described.

3. In a leaching apparatus, a rotatable drum to contain the material to be leached, provided with a liquid-inlet, and with a liquid-outlet passage having side walls projecting inwardly from the inner circumference of the drum and having a discharge-opening for the extract from said passage, and a strainer covering said outlet-passage, substantially as described.

4. In a leaching apparatus, a rotatable drum to contain the material to be leached provided near its inner circumference with an outlet-passage for the extract liquor extended longitudinally of the drum and provided with an inlet for the extract from the drum and with a discharge-opening for the extract from said passage, a strainer covering the said inlet, and means within the drum for lifting a portion of the material to be leached, substantially as described.

5. In a leaching apparatus, a rotatable drum provided with a partition-wall forming a leaching-chamber and a liquor-chamber, and having an outlet-passage for the extract from the leaching-chamber into the liquor-chamber, extended longitudinally of said drum within said leaching-chamber, a strainer for said outlet-passage, and a liquor-outlet for said liquor-chamber, substantially as described.

6. In a leaching apparatus, a rotatable drum having a partition-wall forming a leaching-chamber and a liquor-chamber, and provided with a liquid-inlet for the leaching-chamber, and with an outlet for the extract liquor into the liquor-chamber near the circumference of the drum, and a heating apparatus within the leaching-chamber attached to the drum to revolve therewith and comprising a steam-inlet pipe $b^7$, a fitting $b^{10}$, pipes $b^{12}$, $b^{13}$ connected to said fitting and extended in substantially opposite directions toward the circumference of the drum, branch pipes $b^{15}$, $b^{16}$, $b^{20}$, $b^{21}$ extended substantially at right angles near the opposite ends of the leaching-chamber, pipes $b^{18}$, $b^{19}$ extended longitudinally of the drum and connecting said branch pipes together, the pipe $b^{22}$ connecting the branch pipes $b^{20}$, $b^{21}$, to the pipe $b^{13}$, and the outlet-pipe $b^{14}$ connected to the said fitting, substantially as described.

7. In a leaching apparatus, a rotatable drum to contain the material to be leached, provided with a liquid-inlet, and with a liquid-outlet passage for the extract having side walls projecting inwardly from the inner circumference of the drum and having a discharge-opening for the extract, and a strainer for said outlet-passage composed of a series of bars or slats, substantially as described.

8. In a leaching apparatus, a rotatable drum to contain the material to be leached provided with a liquid-inlet and with a plurality of separate outlets for the extract liquor located within the said drum to pass below the mass or body of material being leached and provided with discharge-openings for the extract from said passages, strainers covering said outlets, and means within the drum to lift a portion of the material to be leached, substantially as described.

In testimony whereof I have signed my name to this specification in the presence of two subscribing witnesses.

GEORGE C. VAUGHN.

Witnesses:
JAS. H. CHURCHILL,
J. MURPHY.